(12) United States Patent
Trankjær et al.

(10) Patent No.: US 10,914,283 B2
(45) Date of Patent: Feb. 9, 2021

(54) ELECTRICAL RECOMBINATION

(71) Applicant: VESTAS WIND SYSTEMS A/S, Aarhus (DK)

(72) Inventors: Søren Viisholm Trankjær, Ringkøbing (DK); Lars Helle, Suldrup (DK); Torben Petersen, Åbyhøj (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/301,654

(22) PCT Filed: May 16, 2017

(86) PCT No.: PCT/DK2017/050154
§ 371 (c)(1),
(2) Date: Nov. 14, 2018

(87) PCT Pub. No.: WO2017/198268
PCT Pub. Date: Nov. 23, 2017

(65) Prior Publication Data
US 2019/0226445 A1 Jul. 25, 2019

(30) Foreign Application Priority Data
May 20, 2016 (DK) .................. 2016 70337

(51) Int. Cl.
*F03D 1/02* (2006.01)
*H02J 3/38* (2006.01)
(Continued)

(52) U.S. Cl.
CPC ............. *F03D 1/02* (2013.01); *F03D 1/00* (2013.01); *F03D 9/255* (2017.02); *F03D 9/257* (2017.02);
(Continued)

(58) Field of Classification Search
CPC . F03D 1/02; F03D 80/82; F03D 9/255; F03D 9/257; F03D 1/00; H02J 3/386; H02M 5/40; H02M 5/46
(Continued)

(56) References Cited

U.S. PATENT DOCUMENTS 7,296,974 B2 * 11/2007 Wobben ............... F03D 1/02
416/132 B
8,044,537 B2 * 10/2011 Asplund ............. H02M 7/7575
307/82

(Continued)

FOREIGN PATENT DOCUMENTS

CN 201388064 Y 1/2010
CN 102734069 A 10/2012
(Continued)

OTHER PUBLICATIONS

PCT Written Opinion of the International Searching Authority for Application No. PCT/DK2017/050154 dated Dec. 10, 2017.
(Continued)

*Primary Examiner* — Viet P Nguyen
(74) *Attorney, Agent, or Firm* — Patterson + Sheridan, LLP

(57) ABSTRACT

Aspects of the present disclosure are generally directed to configurations of power conversion systems for wind turbine generators. For example, certain aspects are directed to a multi-rotor wind turbine. The multi-rotor wind turbine generally includes a plurality of rotors, each coupled to a plurality of electrical generators, one or more machine-side converters, MSCs, coupled to the electrical generators of each of the plurality of rotors and configured to generate at least one direct-current, DC, signal, and one or more line-
(Continued)

side converters, LSCs, coupled to the MSCs and configured to generate at least one AC signal based on the at least one DC signal.

15 Claims, 6 Drawing Sheets

(51) Int. Cl.
    *F03D 80/80*     (2016.01)
    *H02M 5/40*     (2006.01)
    *F03D 9/25*     (2016.01)
    *F03D 1/00*     (2006.01)
    *H02M 5/46*     (2006.01)

(52) U.S. Cl.
    CPC .............. *F03D 80/82* (2016.05); *H02J 3/386* (2013.01); *H02M 5/40* (2013.01); *H02M 5/46* (2013.01); *F05B 2270/337* (2013.01); *Y02E 10/72* (2013.01); *Y02E 10/76* (2013.01)

(58) Field of Classification Search
    USPC ...................................... 290/44, 55
    See application file for complete search history.

(56) References Cited

U.S. PATENT DOCUMENTS

| | | | | |
|---|---|---|---|---|
| 8,933,571 | B2* | 1/2015 | Grinblat | H02P 9/48 |
| | | | | 290/44 |
| 2003/0168864 | A1* | 9/2003 | Heronemus | B63B 1/047 |
| | | | | 290/55 |
| 2004/0046530 | A1* | 3/2004 | Hessling | H02P 9/04 |
| | | | | 322/29 |
| 2005/0012339 | A1 | 1/2005 | Mikhail et al. | |
| 2006/0097519 | A1 | 5/2006 | Steinke | |
| 2009/0212568 | A1* | 8/2009 | Maibach | H02J 3/28 |
| | | | | 290/44 |
| 2011/0049994 | A1* | 3/2011 | Hiller | H02M 7/49 |
| | | | | 307/82 |
| 2012/0043759 | A1* | 2/2012 | Bjork | H02J 3/46 |
| | | | | 290/44 |
| 2012/0217749 | A1* | 8/2012 | Castelli Dezza | H02P 9/305 |
| | | | | 290/44 |
| 2012/0267952 | A1* | 10/2012 | Ballatine | H02J 1/102 |
| | | | | 307/26 |
| 2013/0182465 | A1 | 7/2013 | Wang et al. | |
| 2015/0198145 | A1* | 7/2015 | Diedrichs | F03D 7/04 |
| | | | | 700/287 |
| 2015/0211475 | A1 | 7/2015 | Vorias | |
| 2015/0275859 | A1* | 10/2015 | Rogers | F03D 1/02 |
| | | | | 320/101 |

FOREIGN PATENT DOCUMENTS

| | | |
|---|---|---|
| EP | 2400619 A2 | 12/2011 |
| EP | 2911286 A1 | 8/2015 |
| KR | 20140056703 A | 5/2014 |
| WO | 2017198268 A1 | 11/2017 |

OTHER PUBLICATIONS

PCT International Search Report for Application No. PCT/DK2017/050154 dated Dec. 10, 2017.

Danish Patent and Trademark Office First Technical Examination for Application No. PA 2016 70337 dated Nov. 30, 2016.

* cited by examiner

ELECTRICAL RECOMBINATION

BACKGROUND

Field of the Invention

Aspects of the present disclosure generally relate to techniques for conversion of power generated by a wind turbine generator.

Description of the Related Art

Modern power generation and distribution networks increasingly rely on renewable energy sources, such as wind turbine generators. In some cases, the wind turbine generators may be substituted for conventional, fossil fuel-based generators. Beyond merely generating and delivering electrical power, the wind turbine generators are responsible for contributing to grid stability through frequency regulation. Multi-rotor wind turbines provide several advantages over single rotor turbines, such as ease of installation, maintenance, and transportation.

SUMMARY

Certain aspects of the present disclosure are generally directed to a multi-rotor wind turbine. The multi-rotor wind turbine generally includes a plurality of rotors, each rotor being coupled to a plurality of electrical generators, one or more machine-side converters (MSCs) coupled to the electrical generators of each of the plurality of rotors and configured to generate at least one direct-current (DC) signal, and one or more line-side converters (LSCs) coupled to the MSCs and configured to generate at least one AC signal based on the at least one DC signal. The LSCs may be connectable to a power grid in order to feed converted power into the power grid. In general, the one or more MSCs may be configured to generate the at least one DC signal based on at least one AC signal generated by the plurality of electrical generators.

Certain aspects of the present disclosure are directed to a wind turbine generator. The wind turbine generator generally includes a rotor, a plurality of electrical generators coupled to the rotor, one or more machine-side converters (MSCs) coupled to the electrical generators and configured to generate at least one direct-current (DC) signal, and a line-side converter (LSC) coupled to the MSCs and configured to generate at least one AC signal based on the at least one DC signal. The LSCs may be connectable to a power grid in order to feed converted power into the power grid. In general, the one or more MSCs may be configured to generate the at least one DC signal based on at least one AC signal generated by the plurality of electrical generators.

Certain aspects of the present disclosure are directed to a method of assembly of an electrical system for a multi-rotor wind turbine. The method generally includes coupling a plurality of electrical generators to each rotor of the multi-rotor wind turbine, providing one or more machine-side converters (MSCs) configured to generate at least one direct-current (DC) signal, and providing one or more line-side converters (LSCs) configured to generate at least one AC signal based on the at least one DC signal, coupling the MSCs to the plurality of electrical generators, and coupling the LSCs to the MSCs. The LSCs may be connectable to a power grid in order to feed converted power into the power grid. In general, the one or more MSCs may be configured to generate the at least one DC signal based on at least one AC signal generated by the plurality of electrical generators.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only aspects of this disclosure and are therefore not to be considered limiting of its scope, for the disclosure may admit to other equally effective aspects.

Figure 1:
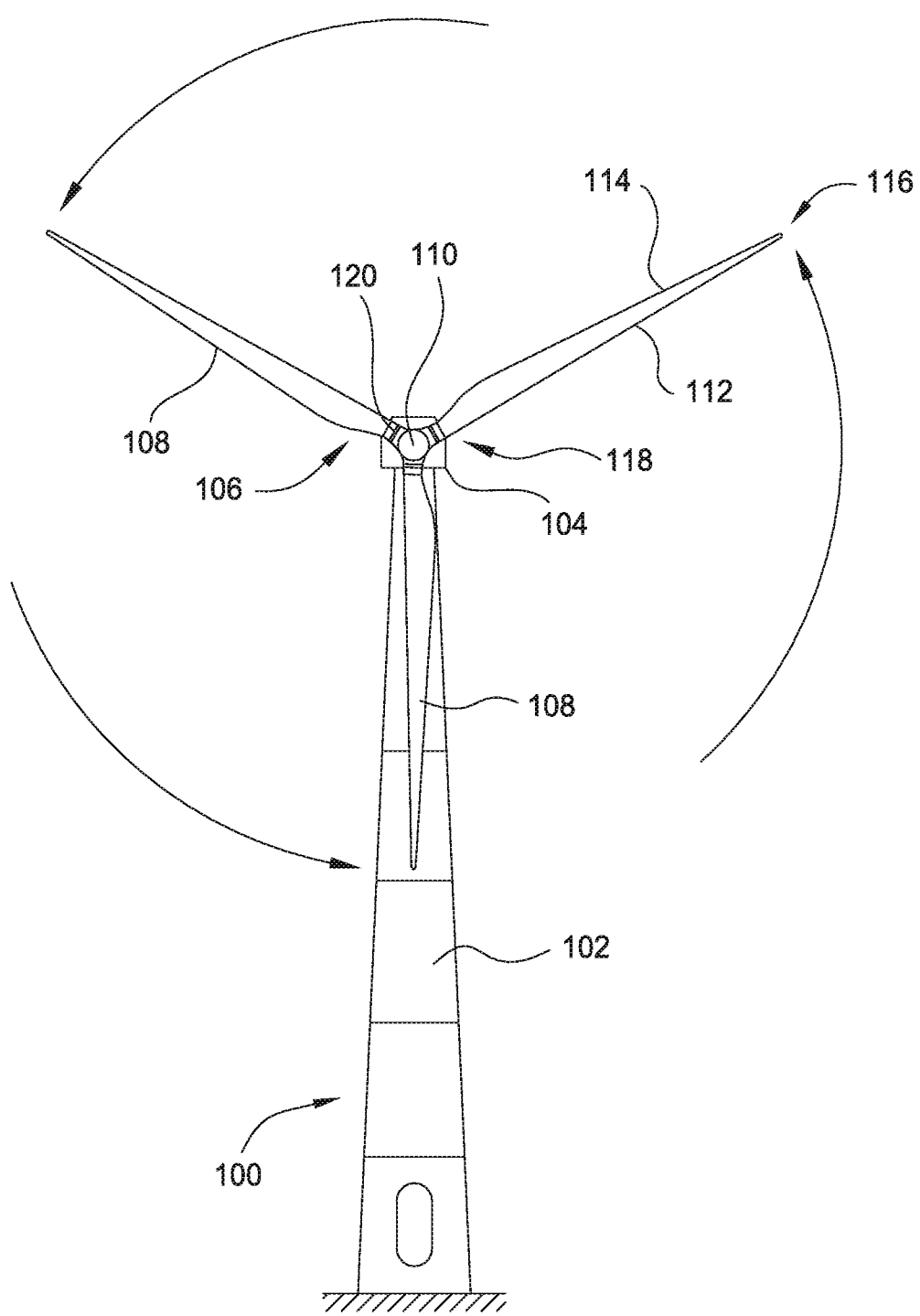
FIG. 1 illustrates an example wind turbine generator.

To facilitate understanding, identical reference numerals have been used, where possible, to designate identical elements that are common to the figures. It is contemplated that elements disclosed in one aspect of the present disclosure may be beneficially utilized on other aspects without specific recitation.

DETAILED DESCRIPTION

Aspects of present disclosure generally relate to power conversion systems for a wind turbine generator. For example, a power conversion system may be used to convert alternating-current (AC) power to direct-current (DC) power, and vice versa. In some aspects, the wind turbine generator may include multiple electric generators coupled to a single rotor via a gearbox. In this case, the power conversion system may include multiple converters that may be operated in parallel for each of the generator. In other cases, a single converter may be used for multiple electric generators. For example, multiple electrical generators may be hardwired in parallel to a common bus, the common bus being coupled to a converter of the power conversion system.

FIG. 1 illustrates an example wind turbine generator 100. The wind turbine generator 100 may include a tower 102 and a wind turbine nacelle 104 located at the top of the tower 102 relatively high off the ground to increase airflow. A wind turbine rotor 106 may be connected with the wind turbine nacelle 104 through a low speed shaft extending out of the nacelle 104. The wind turbine rotor 106 includes three rotor blades 108 mounted on a common hub 110, but may include any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner.

The wind turbine rotor 106 may be coupled to a gearbox (e.g., a belt transmission) that powers an electrical generator that may be located in the wind turbine nacelle 104. In some aspects, the gearbox may power multiple electrical generators that may be located in the wind turbine nacelle 104. In this case, the electrical generators may be asynchronous. As presented above, the electrical energy from the electrical generator(s) may be converted by a power conversion system to a form that can be fed into a power grid. The power conversion system converts and transfers power from the electrical generators to the power grid.

In certain aspects, the blades 108 may be connected to the hub 110 using pitch bearings 120 such that each blade 108 may be rotated around its longitudinal axis to adjust the blade's pitch. The pitch angle of a blade 108 may be controlled by linear actuators or stepper motors, for example, connected between the hub 110 and the blade 108. Blade pitch control may also be used among other systems to increase the power generated below rated wind speeds and to reduce the power generated above the rated wind speed to prevent excessive loading on turbine components, e.g., the generator and gearbox.

Figure 2:
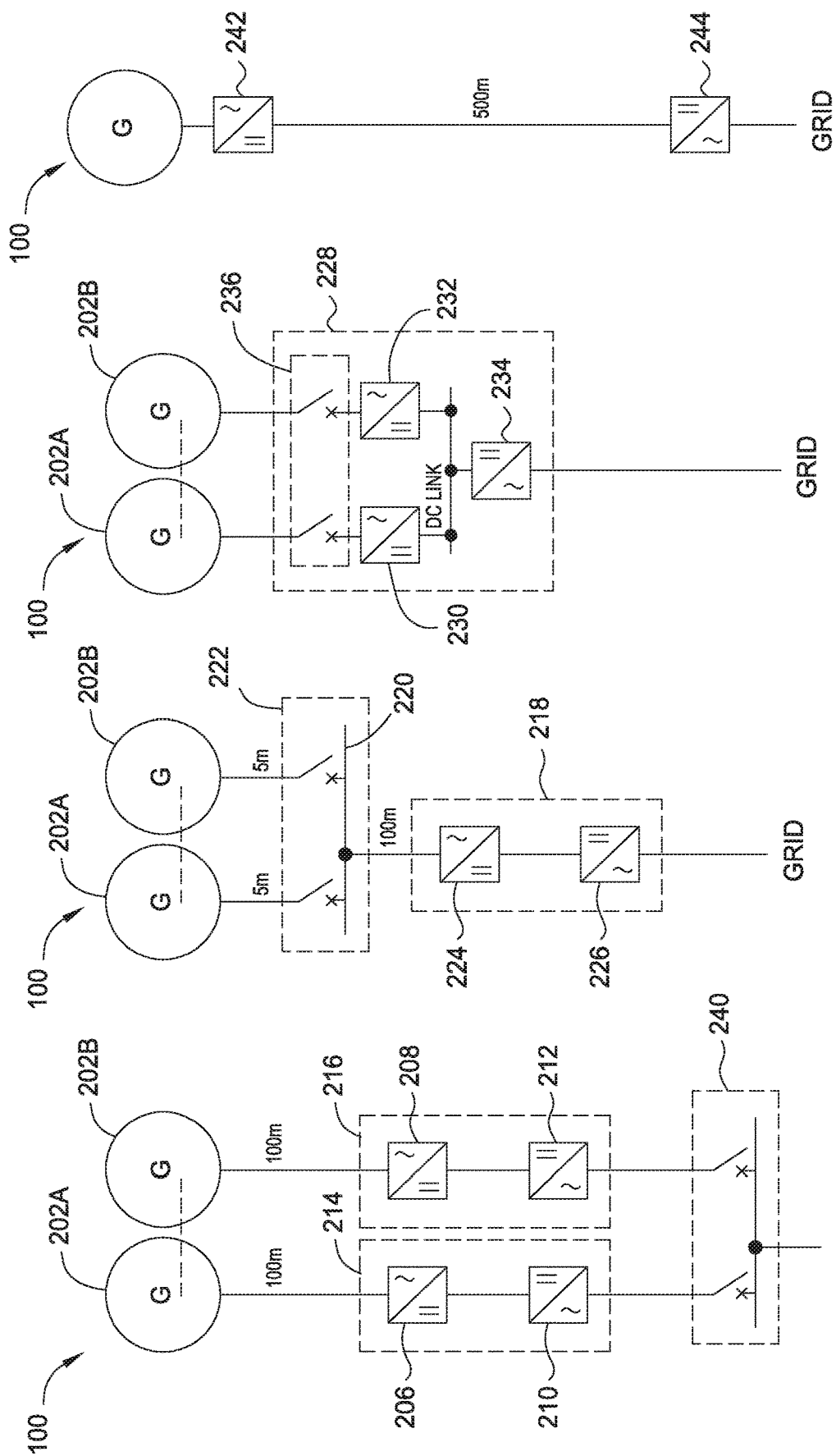
FIGS. 2A-2D illustrate example power conversion systems for a wind turbine generator, in accordance with certain aspects of the present disclosure.

FIG. 2A illustrates a power conversion system for the wind turbine generator 100, in accordance with certain aspects of the present disclosure. The wind turbine generator 100 may include multiple (a plurality of) electrical generators 202A and 202B (collectively electrical generators 202). A common gearbox may be coupled to the rotor 106 and configured to drive both the electrical generators 202. Each of the electrical generators 202 may be coupled to a power conversion system 214 and 216. By using a plurality of electrical generators for each rotor, instead of one single electrical generator for each rotor, smaller and less complex electrical generators can be used. The transport/shipment and installation of the wind turbine generator are also facilitated when the electrical generator is smaller in size.

Each of the power conversion systems 214 and 216 may include a machine side converter (MSC) 206 and 208, which may be configured to convert AC power generated by the electrical generators 202 to DC power, or in alternative wording to convert at least one AC signal generated by the electrical generators to at least one DC signal. Moreover, each of the MSCs 206 and 208 may be coupled to a respective line side converter (LSC) 210 and 212 configured to convert the DC power generated by MSCs 206 and 208 to AC power, or in alternative wording, to convert the at least one DC signal to at least one AC signal. The LSC's can be connectable to a power grid in order to feed the power (in alternative wording the AC signal) to the power grid. A power grid can be an interconnected network for delivering power to consumers connected to the power grid. In general, each MSC 206, 208 may be coupled to at least one LSC 201, 212 via at least one DC-link. The power conversion system 216 may also include one or more controllers configured to control the MSCs 206 and 208 and LSCs 210 and 212. In some cases, the AC power generated by the LSCs 210 and 212 may have a higher frequency than the AC power generated by the electrical generators 202. The power conversion systems may be coupled to a grid via one or more switches 240, allowing the power conversion systems 214 and 216 to be decoupled from the grid.

In certain aspects, the power conversion systems 214 and 216 may be located in the tower 102, or at a base the tower 102, allowing for more space in the wind turbine nacelle 104. For example, the power conversion systems 214 and 216 may be about 100 meters away from the electrical generators 202.

FIG. 2B illustrates the wind turbine generator 100 with a designated power conversion system 218, in accordance with certain aspects of the present disclosure. For example, both of the electrical generators 202 may be coupled to the same power conversion system 218, as illustrated. In this case, the electrical generators 202 may be wired in parallel to a bus 220, which may be coupled to the power conversion system 218. In certain aspects, one or more switches 222 may be used to selectively couple the electrical generators 202 to the power conversion system 218. In some cases, the switches 222 may be located in the wind turbine nacelle 104 (e.g., about 5 meters away from the electrical generators 202).

The power conversion system 218 includes an MSC 224 configured to convert an AC power from the electrical generators 202 to DC power, or in alternative wording, convert at least one AC signal from the electrical generator 202 to at least one DC signal. The MSC 224 may be coupled to a LSC 226 via a DC link. The LSC 226 is arranged to convert at least one DC signal to at last one AC signal, or in alternative wording, arranged to generate at least one AC signal based on the at least one DC signal. In some cases, the power conversion system may be located in the tower 102 (e.g., about 100 meters away from the switches 222). By using a designated power conversion system 218 for multiple generators 202, the cost of the electrical system for the wind turbine generator 100 may be reduced. Moreover, having a single power conversion system 218 for multiple generators 202 may take up less space.

FIG. 2C illustrates the wind turbine generator 100 with a designated LSC, in accordance with certain aspects of the present disclosure. For example, the power conversion system 228 may include an MSC 230 coupled to the electrical generator 202A and an MSC 232 coupled to the electrical generator 202B. Each of the MSCs 230 and 232 may be coupled to the same LSC 234 via a DC link, as illustrated.

By having an LSC 234 that is common to multiple MSCs 230 and 232, power loss in the DC link at the output of the MSCs 230 and 232 may be reduced as compared to having separate LSCs corresponding to each of the MSCs. In some cases, a plurality of switches 236 may be used to selectively couple the MSCs to the electrical generators 202. The power conversion system 228 may be located in the wind turbine nacelle 104, in the tower 102, or at a base of the tower 102.

In some aspects, the output of the LSC 234 may be coupled to a transformer (not shown) configured to increase a voltage of an AC signal generated by the LSC 234. In some cases, eigenmode vibrations of the wind turbine generator 100 may be dampened by placement of the transformer (e.g., as well as the MSCs 230 and 232 and/or LSC 234) in the tower (e.g., middle of the tower).

FIG. 2D illustrates the wind turbine generator 100 having a MSC 242 located in the wind turbine nacelle 104 and a LSC 244 located in the tower 102 or at a base of the tower 102, or outside the tower 102, in accordance with certain aspects of the present disclosure. For example, a distance between the MSC 242 and LSC 244 may be about 500 meters, or less, or more. By placing the LSC 244 in the tower 102 or at the base of the tower 102, the weight of the wind turbine nacelle 104 may be reduced.

In some aspects, a controller for MSC 242 may be located in the wind turbine nacelle 104, and a controller for the LSC 244 may located in the tower 102 or at the base of the tower 102. In some aspects, a controller for MSC 242 may be located in the tower 102, or at the base of the tower, or outside the tower 102. In some cases, it may be advantageous to place the controller for MSC 242 outside the nacelle to reduce the amount of equipment in the nacelle, e.g. in order to reduce the weight of the nacelle.

Figure 3:
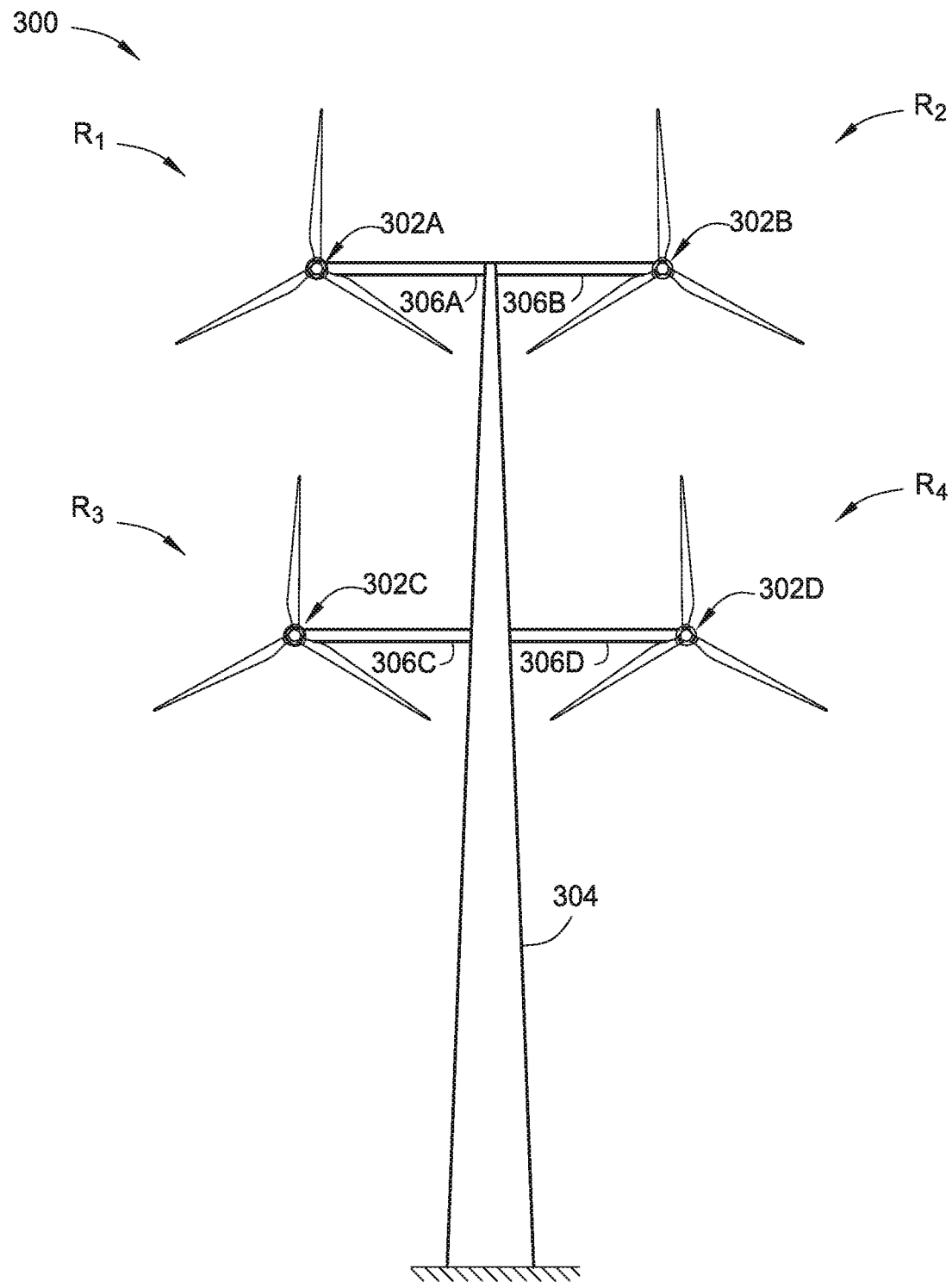
FIG. 3 illustrates an example multi-rotor wind turbine, in accordance with certain aspects of the present disclosure.

FIG. 3 illustrates a wind turbine generator 300 with multiple rotors $R_1$, $R_2$, $R_3$, and $R_4$ (collectively rotors $R_n$). A wind turbine generator with a plurality of rotors may be called a multi-rotor wind turbine. Each of the rotors $R_n$ may be configured to transform kinetic energy of the wind into electrical energy. Each of the rotors $R_n$ may have a designated power conversion system, which may be located in a corresponding wind turbine nacelle 302A, 302B, 302C, and 302D (collectively wind turbine nacelles 302) of each of the rotors $R_n$ or in the tower 304. The weight of the rotors $R_n$ and the wind turbine nacelles 302 are supported by the tower 304 and support bars 306A, 306B, 306C, and 306D (collectively support bars 306). Each of the rotors Rn may be coupled to a single electrical generator, or to multiple electrical generators (i.e. a plurality of electrical generators).

Figure 4:
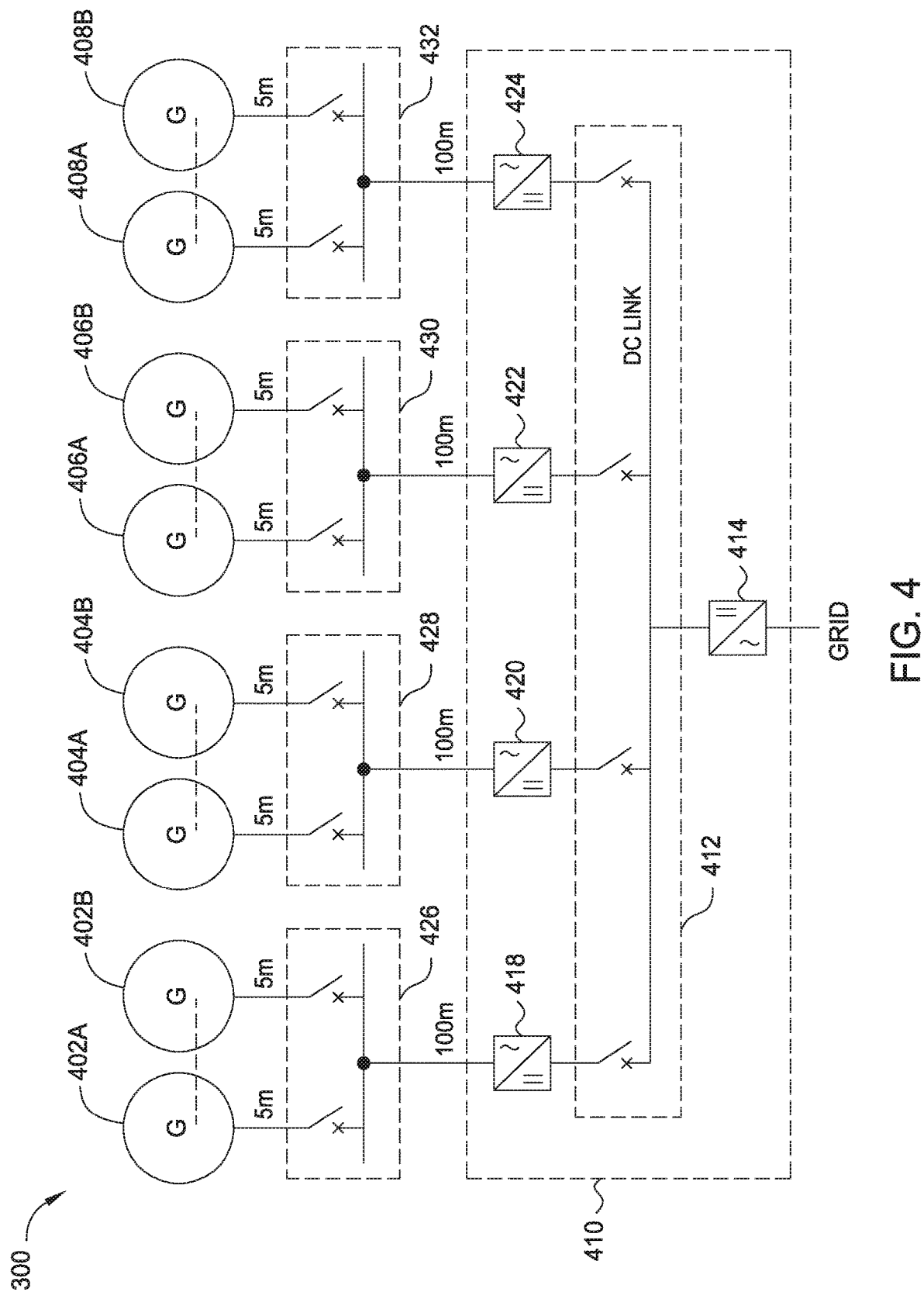
FIG. 4 illustrates an example power conversion system for a multi-rotor wind turbine, in accordance with certain aspects of the present disclosure.

FIG. 4 illustrates an example power conversion system for the multi-rotor wind turbine 300, in accordance with certain aspects of the present disclosure. In certain aspects, the multi-rotor wind turbine 300 may include multiple electrical generators coupled to each of the rotors $R_n$. For example, the electrical generators 402A and 402B (collectively electrical generators 402) may be coupled to rotor $R_1$, the electrical generators 404A and 404B (collectively electrical generators 404) may be coupled to rotor $R_2$, the electrical generators 406A and 406B (collectively electrical generators 406) may be coupled to rotor $R_3$, the electrical generators 408A and 408B (collectively electrical generators 408) may be coupled to the rotor $R_4$.

In certain aspects, the electrical generators 402, 404, 406, 408 may be selectively coupled to a power conversion system 410 via switches 426, 428, 430, and 432, which may be located in a corresponding wind turbine nacelle of the rotors $R_n$. For example, the switches 426, 428, 430, and 432 may be located about 5 meters away from the respective electrical generators 402, 404, 406, and 408.

The power conversion system 410 may include MSCs 418, 420, 422, and 424, each coupled to respective electrical generators 402, 404, 406, and 408. The power conversion system 410 may include one or more switches 412 for selectively coupling the MSCs 418, 420, 422, and 424 to an LSC 414. For example, each of the MSCs 418, 420, 422, and 424 may be selectively coupled to a DC link, and the DC link may be coupled to the LSC 414. In some cases, the switches 426, 428, 430, and 432 may be located in respective wind turbine nacelles 302 of the multi-rotor wind turbine 300.

In some aspects, the power conversion system 410 may be located in the tower 304 (e.g., about 100 meters away from respective switches 426, 428, 430, and 432). By locating the power conversion system 410 in the tower, the weight of the wind turbine nacelles 302 may be reduced as compared to having a designated power conversion system in each of the wind turbine nacelles 302. This reduces strain on the support bars 306, and also allows for more space to be available in the wind turbine nacelles 302 for other components. Moreover, placement of the power conversion system 410 in the tower (e.g., middle of the tower 304) may help to dampen eigenmode vibrations.

In some cases, the power conversion system 410 may be located at a base of the tower 304. By locating the power conversion system 410 at the base of the tower 304, the weight of the tower may be reduced. Moreover, more space may be available in the tower for other components.

Figure 5:
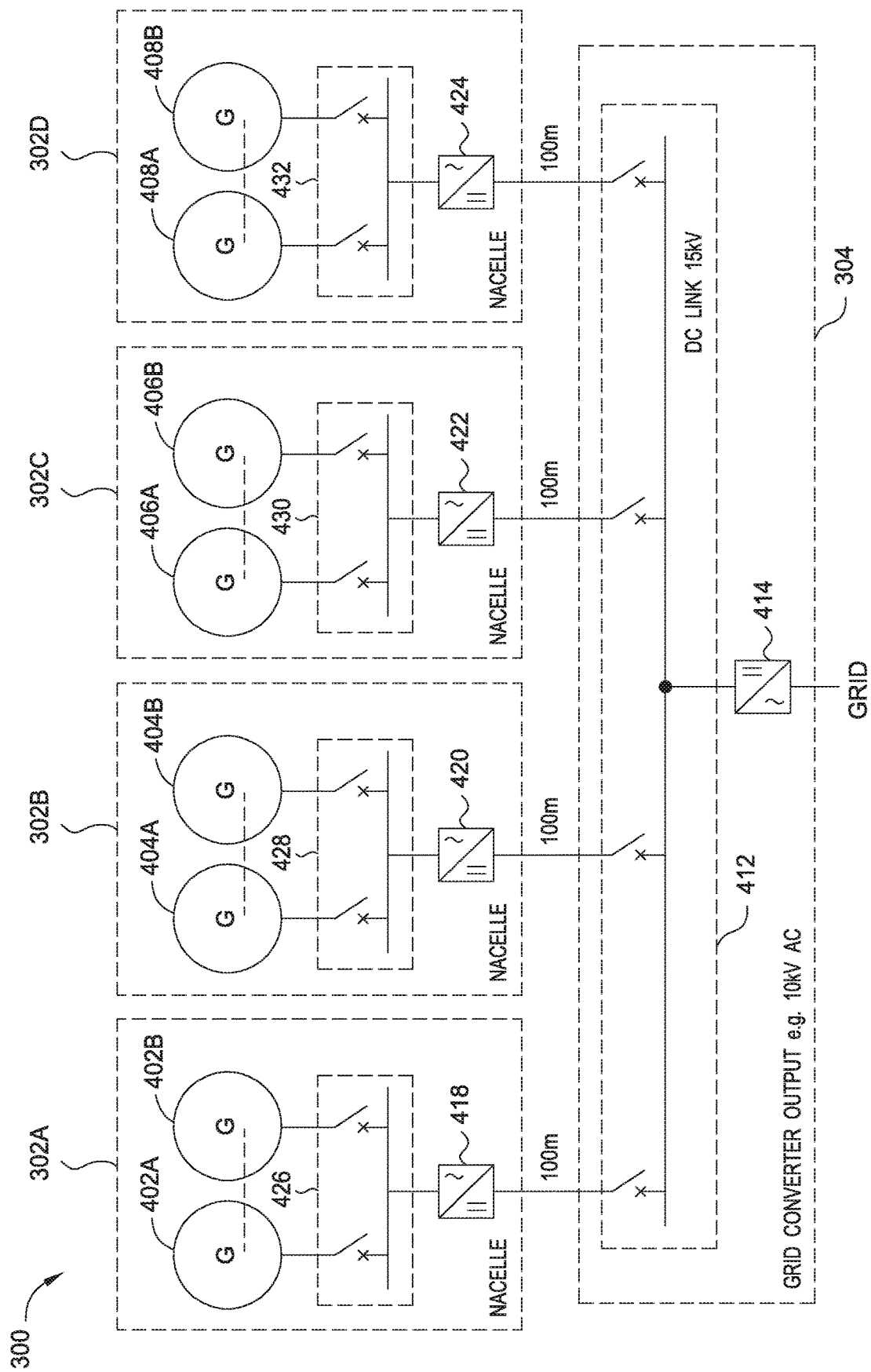
FIG. 5 illustrates an example power conversion system for a multi-rotor wind turbine with machine side converters (MSCs) located in nacelles of the multi-rotor wind turbine, in accordance with certain aspects of the present disclosure.

FIG. 5 illustrates an example power conversion system for the multi-rotor wind turbine 300, in accordance with certain aspects of the present disclosure. As illustrated, the MSCs 418, 420, 422, and 424 (and corresponding controllers) may be located in respective wind turbine nacelles 302. Each of the MSCs 418, 420, 422, and 424 may be selectively coupled to respective electrical generators 402, 404, 406, and 408 via respective switches 426, 428, 430, and 432. In this case, the MSCs 418, 420, 422, and 424 may be coupled to the same LSC 414 through a DC link. In some cases, the voltage at DC link coupled to the output of MSCs 418, 420, 422, and 424 may be at 15 kV, and the voltage of the AC output of the LSC 414 may be at 10 kV.

In some cases, the LSC 414 (and corresponding controller) may be located in a tower 304, or at a base of the tower 304, of the multi-rotor wind turbine 300. For example, the LSC 414 and/or switches 412 may be located about 100 meters away from the MSCs 418, 420, 422, and 424. By locating the LSC 304 in the tower, the weight of the wind turbine nacelles 302 may be reduced as compared to having an LSC in each of the wind turbine nacelles 302. This reduces strain on the support bars 306. Moreover, more space may be available in the wind turbine nacelles 302 for other components.

While examples provided herein have described a power conversion system with respect to a multi-rotor wind turbine with four rotors to facilitate understanding, the techniques described herein can be applied to a multi-rotor wind turbine having any number of rotors. For example, aspects of the present disclosure may be implemented with a multi-rotor wind turbine with eight rotors. Similarly, while examples provided herein have described two generators coupled to a rotor of a wind turbine generator, the techniques described herein can be applied to any number of generators coupled to a rotor.

Figure 6:
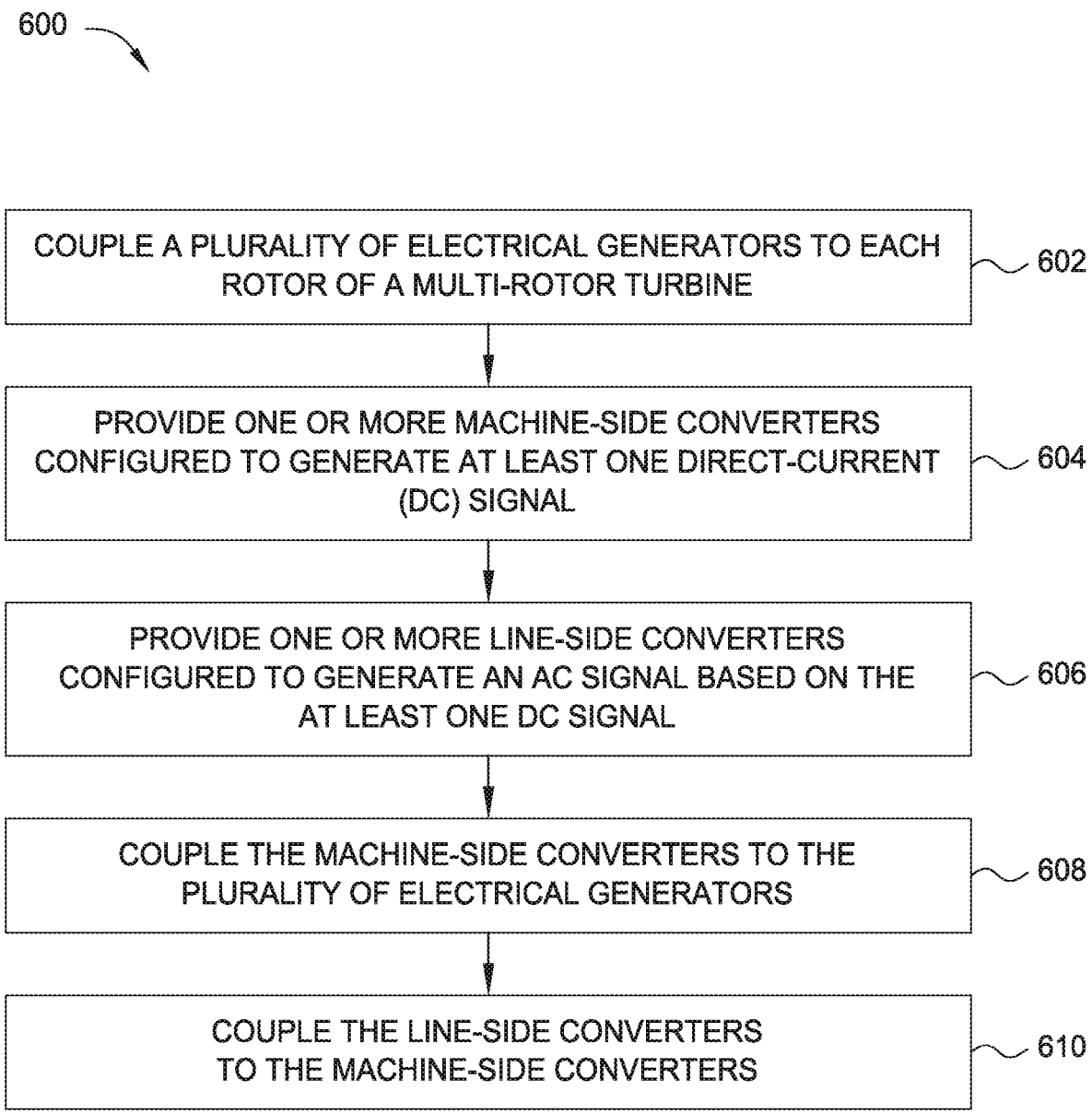
FIG. 6 illustrates example operations for assembly of an electrical system for a multi-rotor wind turbine, in accordance with certain aspects of the present disclosure.

FIG. 6 illustrates example operations 600 for assembly of an electrical system for multi-rotor wind turbine, in accordance with aspects of the present disclosure. The operations 600 begin, at 602, by coupling a plurality of electrical generators to each rotor of the multi-rotor wind turbine. At 604, the operations continue by providing one or more machine-side converters (MSCs) configured to generate at least one direct-current (DC) signal, and at 606, providing one or more line-side converters (LSCs) configured to generate at least one AC signal based on the at least one DC signal. At 608, the MSCs may be coupled to the plurality of electrical generators, and at 610, the LSCs may be coupled to the MSCs.

In some aspects, the one or more MSCs may be a single MSC to be coupled to the plurality of electrical generators of each of the plurality of rotors. In some aspects, the one or more LSCs may be a single LSC to be coupled to the MSC of each of the plurality of rotors. In some cases, the MSC may be located in a nacelle of a respective rotor of the plurality of rotors, and the LSC may be located in a tower of the multi-rotor wind turbine.

In some aspects, the one or more MSCs may be a plurality of MSCs coupled to the electrical generators, and the one or more LSCs may be a single LSC coupled to the plurality of MSCs. In certain aspects, at least one switch may be provided and configured to selectively couple the electrical generators to the MSCs. The at least one switch may be located in a nacelle of a respective rotor of the plurality of rotors, and the MSCs may be located in a tower of the multi-rotor wind turbine.

In certain aspects, the MSCs may be located in a respective nacelle of the plurality of rotors, and the LSCs may be located in a tower of the multi-rotor wind turbine. In certain aspects, the LSCs may be located at a base of a tower of the multi-rotor wind turbine. In some cases, the MSCs and the LSCs may be located in a tower of the multi-rotor wind turbine.

In the preceding, reference is made to aspects presented in this disclosure. However, the scope of the present disclosure is not limited to specific described aspects. Instead, any combination of the preceding features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the preceding aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the aspects disclosed herein may be embodied as a system, method, or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module," or "system." Furthermore, aspects may take the form of a computer program product embodied in one or more computer readable medium(s) having computer readable program code embodied thereon. Program code embodied on a computer readable medium may be transmitted using any appropriate medium, including but not limited to wireless, wireline, optical fiber cable, RF, etc., or any suitable combination of the foregoing.

Aspects of the present disclosure are described above with reference to flowchart illustrations and/or block diagrams of methods, apparatus (systems), and computer program products according to aspects presented in this disclosure. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the figures illustrate the architecture, functionality, and operation of possible implementations of systems, methods, and computer program products according to various aspects. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A multi-rotor wind turbine, comprising:
a plurality of rotors each having at least one blade mounted thereon, each of the plurality of rotors being coupled to a plurality of electrical generators;
a plurality of machine-side converters (MSCs), wherein each of the plurality of MSCs is coupled to at least two of the plurality of electrical generators and configured to generate direct-current (DC) signals; and
a line-side converter (LSC) coupled to the plurality of MSCs and configured to generate at least one AC signal based on the DC signals.

2. The multi-rotor wind turbine of claim 1, wherein:
each of the plurality of MSCs is located in a nacelle of a respective rotor of the plurality of rotors; and
the LSC is located in a tower of the multi-rotor wind turbine.

3. The multi-rotor wind turbine of claim 1, further comprising:
at least one switch configured to selectively couple the electrical generators to the plurality of MSCs.

4. The multi-rotor wind turbine of claim 3, wherein:
the at least one switch is located in a nacelle of a respective rotor of the plurality of rotors; and
the plurality of MSCs are located in a tower of the multi-rotor wind turbine.

5. The multi-rotor wind turbine of claim 1, wherein:
the plurality of MSCs are located in a respective nacelle of the plurality of rotors; and
the LSC is located in a tower of the multi-rotor wind turbine.

6. The multi-rotor wind turbine of claim 1, wherein the LSC is located at a base of a tower of the multi-rotor wind turbine.

7. The multi-rotor wind turbine of claim 1, wherein the plurality of MSCs and the LSC are located in a tower of the multi-rotor wind turbine.

8. A wind turbine generator, comprising:
a rotor on which at least one blade is mounted;
a plurality of electrical generators coupled to the rotor;
a plurality of switches, each coupled to a respective one of the plurality of electrical generators at a first end;
a machine-side converter (MSC) coupled to a second end of each of the plurality of switches and configured to generate at least one direct-current (DC) signal; and
a line-side converter (LSC) coupled to the MSC and configured to generate at least one AC signal based on the at least one DC signal.

9. The wind turbine generator of claim 8, wherein:
the plurality of switches is located in a nacelle of the wind turbine generator; and
the MSC and the LSC are located in a tower of the wind turbine generator.

10. The wind turbine generator of claim 8, wherein the MSC and the LSC are located in a tower of the wind turbine generator.

11. The wind turbine generator of claim 8, wherein:
the MSC is located in a nacelle of the wind turbine generator; and the LSC is located at a base of a tower of the wind turbine generator.

12. A method of assembling an electrical system for a multi-rotor wind turbine, comprising:
  coupling a plurality of electrical generators to each rotor of the multi-rotor wind turbine, wherein at least one blade is mounted on each rotor;
  coupling each of a plurality of machine-side converters (MSCs) to at least two of the plurality of electrical generators, wherein the plurality of MSCs are configured to generate direct-current (DC) signals; and
  coupling a line-side converter (LSC) to the plurality of MSCs; wherein the LSC is configured to generate at least one AC signal based on the DC signals.

13. The method of claim 12, further comprising operating at least one switch to selectively couple at least one of the plurality of MSCs to the electrical generators, wherein:
  the at least one switch is located in a nacelle of the wind turbine; and
  the at least one MSC and the LSC are located in a tower of the wind turbine.

14. The method of claim 12, wherein the plurality of MSCs and the LSC are located in a tower of the wind turbine.

15. The method of claim 12, wherein:
  the plurality of MSCs are located in a nacelle of the wind turbine; and
  the LSC is located at a base of a tower of the wind turbine.

* * * * *